US009324994B2

(12) United States Patent
Oh et al.

(10) Patent No.: US 9,324,994 B2
(45) Date of Patent: Apr. 26, 2016

(54) POSITIVE ELECTRODE ACTIVE MATERIAL WITH HIGH CAPACITY AND LITHIUM SECONDARY BATTERY INCLUDING THE SAME

(75) Inventors: Song Taek Oh, Daejeon (KR); Sun Kyu Kim, Daejeon (KR); Geun Chang Chung, Daejeon (KR); Sin Kyu Kim, Daejeon (KR); Hyun Seok Lee, Daejeon (KR); Bong Kook Youn, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/167,460

(22) Filed: Jun. 23, 2011

(65) Prior Publication Data

US 2011/0311869 A1 Dec. 22, 2011

Related U.S. Application Data

(63) Continuation of application No. PCT/KR2011/001299, filed on Feb. 24, 2011.

(30) Foreign Application Priority Data

Feb. 24, 2010 (KR) .......................... 10-2010-0016852

(51) Int. Cl.
| | | |
|---|---|---|
| H01M 4/13 | (2010.01) | |
| H01M 4/131 | (2010.01) | |
| H01M 4/1391 | (2010.01) | |
| H01M 4/36 | (2006.01) | |
| H01M 4/505 | (2010.01) | |
| H01M 4/525 | (2010.01) | |
| H01M 10/0525 | (2010.01) | |
| H01M 4/04 | (2006.01) | |
| H01M 4/62 | (2006.01) | |

(52) U.S. Cl.
CPC ............ *H01M 4/131* (2013.01); *H01M 4/0447* (2013.01); *H01M 4/1391* (2013.01); *H01M 4/364* (2013.01); *H01M 4/366* (2013.01); *H01M 4/505* (2013.01); *H01M 4/525* (2013.01); *H01M 4/625* (2013.01); *H01M 10/0525* (2013.01); *Y02E 60/122* (2013.01); *Y02P 70/54* (2015.11); *Y02T 10/7011* (2013.01); *Y10T 29/49108* (2015.01)

(58) Field of Classification Search
CPC .......... H01M 10/0525; H01M 4/0447; H01M 4/131; H01M 4/1391; H01M 4/364; H01M 4/366; H01M 4/505; H01M 4/525; H01M 4/625; Y02E 60/122; Y02P 70/54; Y02T 10/7011; Y10T 29/49108
USPC ........ 429/231.9, 231.95, 231.6, 231.7, 231.5, 429/224, 221, 223, 220, 199
See application file for complete search history.

(56) References Cited

U.S. PATENT DOCUMENTS

| | | | |
|---|---|---|---|
| 2003/0008213 A1* | 1/2003 | Cho .......................... | 429/231.95 |
| 2003/0068557 A1* | 4/2003 | Kumashiro et al. ........ | 429/231.8 |
| 2004/0137327 A1* | 7/2004 | Gross et al. ................. | 429/231.8 |
| 2005/0153205 A1 | 7/2005 | Hisashi et al. | |
| 2006/0051671 A1 | 3/2006 | Thackeray et al. | |
| 2006/0051673 A1* | 3/2006 | Johnson et al. ............... | 429/224 |
| 2006/0216612 A1* | 9/2006 | Jambunathan et al. ....... | 429/326 |
| 2006/0286459 A1* | 12/2006 | Zhao et al. .................... | 429/326 |
| 2008/0085452 A1 | 4/2008 | Park | |
| 2008/0157027 A1 | 7/2008 | Manthiram et al. | |
| 2008/0206484 A1* | 8/2008 | Kostecki et al. .............. | 427/575 |
| 2008/0241693 A1* | 10/2008 | Fukuchi et al. ............ | 429/231.1 |
| 2010/0003603 A1* | 1/2010 | Chiang et al. ............ | 429/231.95 |
| 2012/0251883 A1 | 10/2012 | Chang et al. | |

FOREIGN PATENT DOCUMENTS

| | | |
|---|---|---|
| CN | 101080330 A | 11/2007 |
| CN | 101080830 A | 11/2007 |
| CN | 101542787 A | 9/2009 |
| EP | 1 909 345 A1 | 4/2008 |
| JP | 2001-328813 A | 11/2001 |
| JP | 2003-272632 A | 9/2003 |
| JP | 2004-039539 A | 2/2004 |
| JP | 2004-179008 A | 6/2004 |
| JP | 2008/235252 A | 10/2008 |
| JP | 2009-505367 A | 2/2009 |
| KR | 10-2004-0096203 A | 11/2004 |
| KR | 10-2008-0031616 A | 4/2008 |

OTHER PUBLICATIONS

Cabana, J. et al, "Structural and Electrochemical Characterization of Composite Layered-Spinel Electrodes Containing Ni and Mn for Li-Ion Batteries," Journal of Electrochemical Society, Jul. 9, 2009, vol. 156, No. 9, pp. A730-A736.
EPO Extended European Search Report for Application No. 11747722.4 dated Jul. 8, 2013.
Liu, Z. et al, "Effects of conducting carbon on the electrochemical performance of LiCoO2 and LiMn2O4 cathodes," Journal of Power Sources, Jul. 1, 2001, vol. 97-98, pp. 361-365.
Park, S.-H. et al, "Lithium-manganese-nickel-oxide electrodes with integrated layered-spinel structures for lithium batteries," Electrochemistry Communications, Feb. 7, 2007, vol. 9, No. 2, pp. 262-268.
Japanese Office Action issued in Japanese Patent Application No. 2012-554932 on Nov. 5, 2013.
Chinese Office Action and Search Report, issued Aug. 5, 2014, for Chinese Application No. 201180020490.6.

* cited by examiner

*Primary Examiner* — Patrick Ryan
*Assistant Examiner* — Ben Lewis
(74) *Attorney, Agent, or Firm* — Birch, Stewart, Kolasch & Birch, LLP (57) ABSTRACT

A high capacity lithium secondary battery includes a lithium manganese oxide having a layered structure exhibiting a great irreversible capacity in the event of overcharging at a high voltage and a spinel-based lithium manganese oxide. Because it is activated at a high voltage of 4.45 V or higher based on a positive electrode potential, additional lithium for utilizing a 3V range of the spinel-based lithium manganese oxide can be provided and an even profile in the entire SOC area can be obtained. Because the lithium secondary battery includes the mixed positive electrode active material including the spinel-based lithium manganese oxide and the lithium manganese oxide having a layered structure, and is charged at a high voltage, its stability can be improved. Also, the high capacity battery having a large available SOC area and improved stability without causing an output shortage due to a rapid voltage drop in the SOC area can be implemented.

10 Claims, 4 Drawing Sheets

POSITIVE ELECTRODE ACTIVE MATERIAL WITH HIGH CAPACITY AND LITHIUM SECONDARY BATTERY INCLUDING THE SAME

BACKGROUND OF THE INVENTION

1. Field of the Invention

The present invention relates to a positive-electrode active material with high capacity and a lithium secondary battery including the same.

2. Related Art

Recently, lithium secondary batteries are used as a driving power source of vehicles, as well as for mobile electronic devices such as mobile phones, PDAs, laptop computers, and the like, so research is actively ongoing to improve the capacity of secondary batteries. In particular, in order to use a lithium secondary battery as a power source of a midsize and large devices such as HEV, PHEV, EV, and the like, an output of a certain level or higher, as well as high capacity, must be maintained in a state of charge (SOC) area in use in terms of safety and security, so in case of a secondary battery in which a rapid voltage drop occurs while it is discharged, the available SOC area is confined, limiting the secondary battery in its application as a driving power source. Thus, in order to use the lithium secondary battery for midsize and large devices, a material for the lithium secondary battery not causing a rapid output degradation over the wide SOC area and having high capacity is required to be developed.

The use of lithium metal, sulfur compounds, and the like, is considered as a negative electrode active material of the lithium secondary battery, and in most cases, a carbon material are used in consideration of security. When a carbon material is used as the negative electrode material, the capacity of the lithium secondary battery is determined by the capacity of positive electrodes, i.e., the amount of lithium ions contained in a positive electrode active material.

Meanwhile, a lithium-containing cobalt oxide ($LiCoO_2$) is largely used as the positive electrode active material, and besides, the use of a lithium-containing manganese oxide such as $LiMnO_2$ having a layered crystal structure, $LiMn_2O_4$ having a spinel crystal structure, and the like, and a lithium-containing nickel oxide ($LiNiO_2$), or the like, has been considered.

Among the positive electrode active materials, $LiCoO_2$, having excellent life span characteristics and charging/discharging efficiency, is commonly used, but disadvantageously, it has an inferior structural stability and is weak to price competitiveness due to a resource limitation of cobalt used as a raw material thereof. Thus, the use of $LiCoO_2$ in large quantities as a power source in the sectors of electric automobiles, or the like, has a limitation.

The $LiNiO_2$-based positive electrode active material is low-priced and exhibits battery characteristics of high discharge capacity, but it has a rapid phase transition of a crystal structure according to a change in volume accompanying in a charging and discharging cycle and its stability is drastically degraded when exposed to air and moisture.

Also, the lithium-containing manganese oxide, such as $LiMnO_2$, or the like, is advantageous in that it has excellent thermal stability and is low-priced, but has drawbacks in that it has small capacity, poor cycle characteristics and poor high temperature characteristics.

Among the lithium manganese oxides, a spinel-based lithium manganese oxide exhibits a relatively smooth potential in a 4V range (3.7 to 4.3 V) and a 3V range, and when both ranges are all used, a great theoretical capacity of about 260 mAh/g or more (the theoretical capacity is about 130 mAh/g, respectively. in both 3V range and 4V range) can be obtained. However, it is known that cycle and storage characteristics of the spinel-based lithium manganese oxide are critically degraded in the 3V range, making it difficult to utilize the spinel-based lithium manganese oxide. Thus, when only the spinel-based lithium manganese oxide is used as the positive electrode active material, in the lithium secondary battery system in which a lithium source is dependent upon the positive electrode active material, there is no lithium source which may be used for charging and discharging in the 3V range, having a limitation that only a half of the available capacity is used. In addition, with the spinel-based lithium manganese oxide, a rapid voltage drop occurs between the 4V to 3V range to have a discontinuous voltage profile, potentially generating an output shortage in the range, and thus, the spinel-based lithium manganese oxide is not suitable to be used as a power source of midsize and large devices in the fields such as electric automobiles, or the like.

In order to complement the shortcomings of the spinel-based lithium manganese oxide and obtain excellent thermal stability of the manganese-based active material, a layered lithium manganese oxide has been proposed.

In particular, layered $xLi_2MnO_3$-$(1-x)LiMO_2$ ($0<x<1$, M=Co, Ni, Mn, etc.) having greater content of manganese (Mn) than that of other transition metal(s) exhibits a quite high capacity in case of over-charging at a high voltage but disadvantageously has a great initial irreversible capacity. Various explanations are given to this phenomenon, and it is generally admitted as follows. Namely, as shown in a chemical formula below, two lithium ions and two electrons are eliminated along with oxygen gas from $Li_2MnO_3$ constituting the complex in a high voltage state of 4.5 V or higher based on a positive electrode potential in the event of charging, but only one lithium ion and one electron are reversibly inserted into the positive electrode in the event of discharging.

(Charging) $Li_2Mn^{4+}O_3 \rightarrow 2Li+e-+\frac{1}{2}O2+Mn^{4+}O_2$ (Discharging) $Mn^{4+}O_2+Li++e- \rightarrow LiMn^{3+}O_2$ Thus, the initial charging/discharging efficiency of $xLi_2MnO_3$-$(1-x)LiMO_2$ ($0<x<1$, M=Co, Ni, Mn, etc.), although it varies depending on the content of $Li_2MnO_3$ (x value), is lower than that of a general layered structure positive electrode material, e.g., $LiCoO_2$, $LiMn_{0.5}Ni_{0.5}O_2$,  $LiMn_{0.33}Ni_{0.33}Co_{0.33}O_2$, etc.

In this case, in order to prevent lithium precipitation from a negative electrode in the initial cycle according to the great irreversible capacity of $xLi_2MnO_3$-$(1-x)LiMO_2$, an excessive capacity of the negative electrode must be designed, resulting in a problem in that the actual reversible capacity may be possibly reduced. Thus, efforts have been made to regulate the irreversibility through surface coating, or the like, but the problem such as productivity, or the like, is yet to be solved. In addition, in case of a layered structure material, its stability is at issue.

Thus, the sole use of the conventionally known positive electrode active materials of the lithium secondary battery has shortcomings and limitations, so the mixture of the materials is required to be used, and in particular, in order for a lithium secondary battery to be used as a power source of a midsize and large devices, the lithium secondary battery is required not to have a rapid voltage drop range, namely, required to have an even profile in the entire SOC area, as well as having a high capacity, to thus have improved stability.

SUMMARY OF THE INVENTION

It is, therefore, an object of the present invention to provide a high capacity lithium secondary battery in which a mixed positive electrode active material obtained by mixing a lithium compound having a layered structure exhibiting a great irreversible capacity in the event of overcharging at a high voltage and a spinel-based lithium manganese oxide is charged at a relatively high voltage to thus additionally supply lithium for utilizing a 3V range of the spinel-based lithium manganese oxide by using the large irreversible qualities of the lithium compound having the layered structure, and a rapid output degradation in 4V and 3V ranges is restrained to thus use both the 4V and 3V ranges.

In order to achieve the above object, there is provided a lithium secondary battery which includes a mixed positive electrode active material obtained by mixing a spinel-based lithium manganese oxide represented by [Chemical Formula 1] shown below and a lithium manganese oxide having a layered structure represented by [Chemical Formula 2] shown below, and is charged at a voltage of 4.45V or higher based on a positive electrode potential.

$$Li_{1+y}Mn_{2-y-z}M_zO_{4-x}Q_x \qquad \text{[Chemical Formula 1]}$$

Here, 0≤x≤1, 0≤y≤0.34, and 0≤z≤1, M is one or more selected from the group consisting of Mg, Al, Ni, Co, Fe, Cr, Cu, B, Ca, Nb, Mo, Sr, Sb, W, B, Ti, V, Zr, and Zn, and Q is one or more selected from the group consisting of N, F, S, and Cl.

$$aLi_2MnO_3\text{-}(1\text{-}a)LiMO_2 \qquad \text{[Chemical Formula 2]}$$

Here, 0<a<1, M is any one selected from the group consisting of Al, Mg, Mn, Ni, Co, Cr, V, and Fe, or two or more of them simultaneously applied.

In charging the lithium secondary battery, the lithium secondary battery may be charged at a voltage of 4.45V or higher based on the positive electrode potential in a formation step, or in every several cycles or in every cycle following the formation step.

The lithium compound having the layered structure represented by [Chemical Formula 2] may be a material having a potential plateau near 4.45 V to 4.8 V when the lithium secondary battery is charged at the voltage of 4.45 V or higher based on the positive electrode potential, and generating oxygen.

The mixed positive electrode active material may include 1 wt % to 60 wt % of the spinel-based lithium manganese oxide represented by [Chemical Formula 1] and 40 wt % to 99 wt % of the lithium manganese oxide having a layered structure represented by [Chemical Formula 2] over 100 wt % of the mixed positive electrode active material.

The mixed positive electrode active material may include 10 wt % to 50 wt % of the spinel-based lithium manganese oxide represented by [Chemical Formula 1] and 50 wt % to 90 wt % of the lithium manganese oxide having a layered structure represented by [Chemical Formula 2] over 100 wt % of the mixed positive electrode active material.

The spinel-based lithium manganese oxide may form a complex with a conductive material or a precursor of the conductive material.

The conductive material may be a carbon-based material having a crystal structure including graphene or graphite.

The conductive material or the precursor of the conductive material may be included such that a lithium precursor and a manganese precursor, synthetic raw materials of the spinel-based lithium manganese oxide represented by [Chemical Formula 1], and the conductive material or the precursor of the conductive material are mixed and then the mixture is fired at a temperature range in which the conductive material or the precursor is not oxidized to form the complex with the spinel-based lithium manganese oxide represented by [Chemical Formula 1].

Also, the conductive material may be included such that it is coated on the surface of particles of the spinel-based lithium manganese oxide represented by [Chemical Formula 1] according to a dry method through high energy milling performed on the conductive material and the spinel-based lithium manganese oxide represented by [Chemical Formula 1].

The conductive material may be included such that it is coated on the surface of particles of the spinel-based lithium manganese oxide represented by [Chemical Formula 1] according to a wet method of dispersing the conductive material and the spinel-based lithium manganese oxide represented by [Chemical Formula 1] in a solvent, coating the surface of the precursor of the conductive material, drying the same, and retrieving the solvent.

The mixed positive electrode active material may further include any one or two or more lithium-containing metal oxides selected from the group consisting of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and an oxide formed by substituting these with other elements or formed by doping other element(s) therein.

The other element(s) may be any one or two or more elements selected from the group consisting of Al, Mg, Mn, Ni, Co, Cr, V, and Fe.

The lithium-containing metal oxide may be included to be 50 wt % or less over the total weight of the mixed positive electrode active material.

The lithium secondary battery may include: a positive electrode mix including a conductive material, a binder, and a filler, besides the mixed positive electrode active material, and a positive electrode including the positive electrode mix.

The lithium secondary battery may be used as a unit cell of a battery module, a power source of a midsize or large device.

The midsize or large device may be a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system.

According to exemplary embodiments of the present invention, since the positive electrode is configured by mixing the lithium manganese oxide having a layered structure exhibiting a great irreversible capacity and the spinel-based lithium manganese oxide and the lithium secondary battery is charged at a relatively high voltage, the battery of a novel system having great charging/discharging capacity and excellent thermal stability, compared with the related art battery, can be provided.

In addition, since the 3V range of the spinel-based lithium manganese oxide is utilized by using the great irreversible capacity of the lithium manganese oxide having the layered structure, both the 3V and the 4V ranges of the spinel-based lithium manganese oxide can be utilized to maximize the cell capacity and implement a voltage profile having a gentle tilt in the 3V to 4V ranges, thereby providing a lithium secondary battery having an enlarged available SOC area and improved stability.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

The present invention provides a positive electrode active material including a lithium manganese oxide having a layered structure exhibiting a great irreversible capacity when charging is performed at a relatively high voltage (i.e., 4.45 V or higher based on a positive electrode potential) and a spinel-based lithium manganese oxide; and a lithium secondary battery including the positive electrode active material.

The present invention will now be described in detail.

In general, a spinel-based lithium manganese oxide, allowing lithium ions to rapidly spread in terms of its three-dimensional crystal structure, exhibits excellent output characteristics compared with a positive electrode material having a layered structure. Also, since the spinel-based lithium manganese oxide uses low-priced manganese, it has come to prominence as a positive electrode active material of a lithium secondary battery. However, the spinel-based lithium manganese oxide has two operation voltages divided into 4V range and 3V range, so the use of the spinel-based lithium manganese oxide alone causes a rapid output drop between the operation voltages of the two ranges. An oxidation-reduction reaction of $LiMn_2O_4$, one of typical materials of the spinel-based lithium manganese oxide, in the respective voltage bands is as follows:

Oxidation-reduction reaction in 4V range: $Mn_2O_4 + Li^+ + e^- \leftrightarrow LiMn_2O_4$ Oxidation-reduction reaction in 3V range: $LiMn_2O_4 + Li^+ + e^- \leftrightarrow Li_2Mn_2O_4$ In the oxidation-reduction reaction, it is easy to synthesize $LiMn_2O_4$ for using the 4V range, but it is not easy to synthesize $Li_2Mn_2O_4$ for utilizing the 3V range, making it difficult to obtain a compound having a stable structure. Also, in the current lithium secondary battery system which depends on the positive electrode active material as a lithium source, there is no lithium source to be used in the 3V range, making it difficult to operate the spinel-based lithium manganese oxide in the 3V range.

Thus, in order to improve the shortcomings of the spinel-based lithium manganese oxide and utilize the 3V range, $Li_2Mn_2O_4$ having a stable spinel structure is required to be synthesized or a material capable of supplying additional lithium to the $Li_2Mn_2O_4$ spinel is required, and also, in order to simultaneously use the 4V range and the 3V range, a voltage profile having a gentle tilt without causing a rapid voltage drop is required to be exhibited in the entire 3V to 4V ranges.

However, cycle characteristics according to lithium insertion/elimination occurring in the reaction of the 3V range have many problems due to expansion and contraction of an asymmetrical lattice caused by the results of a Jahn-Teller distortion resulting from $Mn^{3+}$ ions during charging and discharging. Namely, the spinel-based lithium manganese oxide exists as a single cubic phase in the 4V range (3.7 V to 4.3 V) but has an excessive amount of $Mn^{3+}$ in the 3V range (2.5 V to 3.5 V) to cause a phase transition phenomenon from the cubic phase to a tetragonal phase due to the Jahn-Teller distortion effect, drastically reducing the charging/discharging characteristics. For example, when a secondary battery is manufactured under the same conditions, an actual capacity in the 4V range is close to a theoretical capacity (the theoretical capacity is about 130 mAh/g in both the 3V range and the 4V range), but a general actual capacity (90 mAh/g) in the 3V range falls greatly short of the theoretical capacity. The foregoing structural transition limits the development of $Li_2Mn_2O_4$ having a stable spinel structure in the 3V range.

Thus, the inventors of the present application have conducted various experiments and in-depth research to end up with a positive electrode active material which can stably operate in the 3V range by supplying additional lithium to the spinel-based lithium manganese oxide and can stably use both the 3V and 4V ranges without causing a rapid voltage drop between the 4V range and the 3V range.

Preferably, the spinel-based lithium manganese oxide included in the positive electrode active material may be a material represented by Chemical Formula 1 shown below:

$$Li_{1+y}Mn_{2-y-z}M_zO_{4-x}Q_x \quad \text{[Chemical Formula 1]}$$

Here, $0 \le x \le 1$, $0 \le y \le 0.3$, and $0 \le z \le 1$, and M is one or more selected from the group consisting of Mg, Al, Ni, Co, Fe, Cr, Cu, B, Ca, Nb, Mo, Sr, Sb, W, B, Ti, V, Zr, and Zn, and Q is one or more selected from the group consisting of N, F, S, and Cl.

In this manner, the structural stability of the spinel-based lithium manganese oxide can be improved and life span characteristics of the spinel-based lithium manganese oxide can be extended by replacing a portion of Mn with a different element.

The positive electrode active material according to the present exemplary embodiment is obtained by mixing a lithium manganese oxide having a layered structure exhibiting a great irreversible capacity in the event of charging at a high voltage to the spinel-based lithium manganese oxide represented by [Chemical Formula 1] shown above.

Accordingly, since the lithium manganese oxide having a layered structure to the spinel-based lithium manganese oxide, irreversibility of a negative electrode can be filled by using the great irreversible capacity of the lithium compound having the layered structure and a lithium source utilized in the 3V range of the spinel-based lithium manganese oxide can be secured, thus providing a lithium secondary battery with a high capacity.

An actual state of charge (SOC) of a positive electrode in the lithium secondary battery is limited by the initial irreversible reaction on the surface of the negative electrode. Namely, a solid electrolyte interface (SEI) film is formed on the surface of the negative electrode in the event of the initial charging, and at this time, a large amount of lithium ions discharged from the positive electrode is used, reducing the amount of lithium ions substantially participating in the charging and discharging operation. Thus, when a 100% spinel-based lithium manganese oxide is used, the entirety of the lithium ions which have moved to the negative electrode do not return to the spinel-based lithium manganese oxide because of the irreversible reaction, resulting in an increase in the SOC state of the lithium manganese oxide.

The lithium manganese oxide having a layered structure included in the positive electrode active material according to the present exemplary embodiment is a material capable of providing lithium for the initial irreversible reaction on the surface of the negative electrode and also provides a lithium source to the positive electrode, thus additionally providing lithium required for the reaction of the spinel-based lithium manganese oxide in the 3V range.

Namely, the mixed positive electrode active material obtained by mixing the spinel-based lithium manganese oxide and the lithium manganese oxide having a layered structure having the great irreversible capacity provide lithium ions consumed for the initial irreversible reaction on the surface of the negative electrode, and thereafter, in the event of discharging, the lithium ions, which have not been used for the irreversible reaction of the negative electrode, move to the positive electrode so as to be additionally provided to the spinel-based lithium manganese oxide to allow for the active operation even in the 3V range.

In general, an irreversible capacity can be defined as (first cycle charge capacity−first cycle discharge capacity), and the lithium manganese oxide having a layered structure exhibiting the great irreversible capacity can be represented by [Chemical Formula 2] shown below:

$a\text{Li}_2\text{MnO}_3\text{-}(1-a)\text{LiMO}_2$  [Chemical Formula 2]

Here, 0<a<1 and M is any one selected from the group consisting of Al, Mg, Mn, Ni, Co, Cr, V, Fe, Cu, Zn, Ti, and B, or two or more of them simultaneously applied.

In the lithium manganese oxide having a layered structure as represented by Chemical Formula 2, the content of Mn, among the essential transition metals (or the essential transition elements), is greater than that of the other metals, excluding lithium, and in the event of charging at a high voltage of 4.45 V or higher based on the positive electrode potential, the lithium manganese oxide having a layered structure generates oxygen while having a potential plateau range in the vicinity of 4.45 V to 4.8 V.

In this case, as oxygen of $\text{Li}_2\text{MnO}_3$ is oxidized, two lithium ions are generated, namely, a reaction in the form of 2Li+2e+ 0.5O$_2$ takes place, and thereafter, in the occurrence of discharging, only one lithium returns to the positive electrode due to the shortage of a space for lithium, so the material can have a great irreversible capacity. When the ratio of $\text{Li}_2\text{MnO}_3$ is increase to implement a high capacity, the initial irreversible capacity can be further increased. Thus, the irreversible capacity of the lithium manganese oxide having a layered structure can vary depending on a preparation method, composition, and charging conditions.

Also, the lithium manganese oxide having a layered structure represented by [Chemical Formula 2] manifests the irreversible capacity tantamount to about 10% to 40% of the capacity when charging is performed at a high voltage of 4.45 V or higher based on the positive electrode potential. Thus, in order to use such irreversible characteristics, the process of performing charging at a relatively high voltage is required, so in the present exemplary embodiment, the lithium second battery including the mixed positive electrode active material is charged at the voltage of 4.45 V or higher based on the positive electrode potential. In this case, the charging method is not particularly limited and a known method in the art may be used.

The charging process may be performed in every operation cycle, or performed one time or several times in a battery formation step in consideration of stability and fairness. In order to perform charging in every cycle, electrolyte which can be stably operated at the high voltage of 4.45 V or higher is required, but it is not easy to implement such electrolyte at a current technical stage.

Meanwhile, after the charging operation or the formation step is finished, a degassing process must be necessarily performed in order to remove gas such as oxygen, or the like, which has been generated in great quantities in the charging process.

As described above, when the lithium manganese oxide having a layered structure is charged at a high voltage of 4.5 V or higher based on the positive electrode potential, because the irreversible capacity can be differ depending on the composition of the material, the surface coating, and the charging voltage and conditions, the content with the spine-based lithium manganese oxide can be regulated.

Accordingly, an appropriate content of the lithium manganese oxide having a layered structure represented by [Chemical Formula 2] manifesting the great irreversible capacity can be sought in consideration of the relationships among the irreversible capacity of the material, the irreversible capacity of the negative electrode, and the 3V capacity of the spinel-based lithium manganese oxide.

For example, as described in the first embodiment of the present invention, when charging is performed at the voltage of 4.6 V based on the positive electrode potential, the irreversible capacity of the lithium manganese oxide having a layered structure represented by [Chemical Formula 2] is about 70 mAh/g, and the 3V capacity of the spinel-based lithium manganese oxide is 12 mAh/g. Thus, an appropriate ratio between the lithium manganese oxide having a layered structure represented by [Chemical Formula 2] and the spinel-based lithium manganese oxide is 2:1 in consideration of the irreversibility of the negative electrode.

If charging is performed at 4.9 V based on the positive electrode potential, the irreversible capacity can be further increased, so the content of the spinel-based lithium manganese oxide can be increased up to 50%.

When the lithium secondary battery according to the present exemplary embodiment is charged at the relatively high voltage of 4.45V or higher to manifest the great irreversible capacity, the battery exhibits a gentle voltage profile in the range of 2V to 4.6V. Namely, the rapid voltage drop in the vicinity of the boundary of the 3V, the operation voltage range of the spinel and the 4V range are restrained to exhibit the overall gentle voltage profile, so the output shortage otherwise due to the rapid voltage drop in a particular SOC area does not occur, extending the available SOC area.

As for the composition of the mixed positive electrode active material, namely, the spinel-based lithium manganese oxide and the lithium manganese oxide having a layered structure represented by [Chemical Formula 2], the lithium manganese oxide having a layered structure represented by [Chemical Formula 2] is contained by 40 wt % to 99 wt %, preferably, 60 wt % to 90 wt % and the spinel-based lithium manganese or a complex with a conductive material is contained by 1 wt % to 60 wt %, preferably, 10 wt % to 40 wt %, based on the total weight of the mixture.

When the content of the spinel-based lithium manganese oxide is too small, stability is not secured and the effect of addition of the spinel-based lithium manganese oxide cannot be obtained. Also, when the content of the lithium manganese oxide having a layered structure represented by [Chemical Formula 2] is less than 40 wt %, it has a limitation of additionally supplying lithium required for the 3V range of the spinel-based lithium manganese oxide, making it difficult to exhibit high capacity.

Meanwhile, the spinel-based lithium manganese oxide according to the present exemplary embodiment may be the general type spinel-based lithium oxide as described above, and in addition, preferably, a spinel-based lithium manganese oxide formed as a complex with a material improving conductivity may be prepared so as to be mixed with the lithium manganese oxide having a layered structure represented by [Chemical Formula 2].

The positive electrode active material according to the present exemplary embodiment including the complex of the spinel-based lithium manganese oxide and the conductive material can have further improved conductivity in the 3V range of the spinel-based lithium manganese oxide and exhibit a desired level of charging and discharging characteristics to enhance the cycle stability and life span.

In order to form the complex, the spinel-based lithium manganese oxide may be synthesized and then combined with the conductive material through milling, or the like, or when the spinel-based lithium manganese oxide is fired, the conductive material or a precursor of the conductive material may be included to prepare the complex.

The conductive material is not particularly limited so long as it has excellent electric conductivity and does not cause a side reaction in an internal environment of the secondary battery. In particular, a carbon-based material having high conductivity is preferred.

A preferred example of the carbon-based material having high conductivity may be a material including graphene or graphite as a crystal structure. A conductive polymer having high conductivity may be also used according to circumstances.

Also, the precursor of the conductive material is not particularly limited. Namely, any material may be used so long as it can be converted into a conductive material in a firing process at a relatively low temperature under an atmosphere including oxygen, e.g., under air atmosphere.

In the method for forming the complex, there may be various methods of coating the conductive material on the surface of particles of the spinel-based lithium manganese oxide through milling, and in a preferred embodiment, the complex may be achieved through a dry method according to high energy milling or mixing.

In another example, the coating may be performed through a wet method such that the spinel-based lithium manganese oxide is dispersed in a solvent, the precursor of the conductive material is coated on the surface of the spinel-based lithium manganese oxide, and then, the solvent is retrieved.

In this case, if the amount of the conductive material is too little, a desired effect cannot be obtained, while if the amount of the conductive material is too much, the amount of the active material would be relatively decreased to reduce the capacity. Thus, preferably, the content of the conductive material is 1 wt % to 15 wt % based on the total weight of the complex of the conductive material and the spinel-based lithium manganese oxide.

Meanwhile, in another method for forming the complex by including the conductive material or the precursor thereof together in firing the spinel-based lithium manganese oxide, a lithium precursor and a manganese precursor, a synthesized raw material of the lithium manganese oxide and the conductive material or the precursor of the conductive material are mixed, and then, the mixture is fired within a temperature range in which the conductive material and the precursor is not oxidized.

In this case, preferably, the content of the conductive material or the precursor of the conductive material is 1 wt % to 15 wt based on the total weight of the complex of the conductive material and the spinel-based lithium manganese oxide.

As described above, the firing temperature is a temperature at which the conductive material or the precursor thereof is not oxidized to be lost. Preferably, the firing temperature ranges from 650° C. to 800° C. If the firing temperature is too low, the yield of the lithium manganese oxide is degraded, whereas if the firing temperature is too high, the conductive material or the like would be possibly oxidized. The firing may be performed under the atmosphere that an oxygen concentration ranges from 5% to 30%, and preferably, performed under air atmosphere.

According to the method, the complex of the lithium manganese oxide and the conductive material (or the precursor thereof) undergoes the firing process at a relatively low temperature, so a step of grinding the mixture before the firing process may be additionally included.

In the present exemplary embodiment, the spinel-based lithium manganese oxide may include a cubic phase or a tetragonal phase, or the both phases. Namely, it may have a complex structure in which particles of the conductive material are positioned between the grains of the lithium manganese oxide having the cubic phase, may have a complex structure in which particles of the conductive material are positioned between the grains of the lithium manganese oxide having the tetragonal phase, or may have a complex structure in which particles of the conductive material are positioned between the grains of the lithium manganese oxide having both the cubic phase and the tetragonal phase.

The mixed positive electrode active material according to an exemplary embodiment of the present invention may further include a following lithium-containing metal oxide, besides the lithium manganese oxide having a layered structure exhibiting a great irreversible capacity in the event of charging at a high voltage of 4.45 V or higher based on the positive electrode potential and the spinel-based lithium manganese oxide.

The lithium-containing metal oxide may include various active materials, which are known in the art, such as a lithium cobalt oxide, a lithium nickel oxide, a lithium cobalt-nickel oxide, a lithium cobalt-manganese oxide, a lithium manganese-nickel oxide, a lithium cobalt-nickel-manganese oxide, a lithium-containing olivine type phosphate, and an oxide formed by substituting these with other elements or formed by doping other element(s) therein. The other element(s) may be any one or two or more selected from the group consisting of Al, Mg, Mn, Ni, Co, Cr, V, and Fe. These lithium-containing metal oxides must be contained by 50 wt % over the total weight of the mixed positive electrode active material to obtain the effect of the present invention.

In addition, the present provides a positive electrode invention provides a positive electrode mix including the mixed positive electrode active material.

The positive electrode mix may selectively further include a conductive material, a binder, and a filler, in addition to the positive electrode active material.

The conductive material is generally added to be 1 wt % to 50 wt % based on the total weight of the mixture including the positive electrode active material. The conductive material is not particularly limited so long as it has conductivity without causing a chemical change in the battery. The conductive material may include, for example, graphite such as natural graphite, artificial graphite, or the like; carbon black, such as acetylene black, Ketjen black, channel black, furnace black, lamp black, summer black; conductive fiber such as carbon fiber, metal fiber, or the like; metal powder such as fluorocarbon, aluminum, nickel powder, or the like; conductive whisky such as zinc oxide, calcium titanic acid, or the like; a conductive oxide such as titanium dioxide, or the like; a conductive material such as a polyphenylene derivative, or the like. According to circumstances, a second coated layer having conductivity may be added to the positive electrode active material, to thus omit the addition of the conductive material.

The binder is a component assisting the combining between the active material and the conductive material, or the like, and the combining with respect to a current collector. In general, the binder is generally added to be 1 wt % to 50 wt % based on the total weight of the mixture including the positive electrode active material. The binder may include, for example, polyvinylidene difluoride, polyvinyl alcohol, carboxymethylcellulose (CMC), starch, hydroxypropylcellulose, regenerated cellulose, polyvinylpyrrolidone, tetrafluoreethylene, polyethylene, polypropylene, ethylene-propylene-diene terpolymer (EPDM), sulfonic EPDM, styrene butylene rubber, fluorinated rubber, various polymers, and the like.

The filler is a component for restraining the positive electrode from expanding, which is selectively used. The filler is not particularly limited so long as it is a fibrous material without causing a chemical change in the battery. The filter may include, for example, an olefin-based polymer such as polyethylene, polypropylene, or the like; a fibrous material such as glass fiber, carbon fiber, or the like.

The present invention also provides a positive electrode in which the positive electrode mix is applied to the current collector.

The positive electrode may be fabricated by applying slurry created by mixing the positive electrode mix, such as the mixed positive electrode active material, the conductive material, the binder, the filler, and the like, applied to a positive electrode current collector, in a solvent such as NMP, or the like, to a negative electrode current collector, and then drying and rolling the same.

The positive electrode current collector generally has a thickness ranging from 3 μm to 500 μm. The positive electrode current collector is not particularly limited so long as it has high conductivity without causing a chemical change in the battery. The positive electrode current collector may include, for example, stainless steel, aluminum, nickel, titanium, fired oxygen, or aluminum, or a current collector obtained by surface-treating aluminum or stainless steel with carbon, nickel, titanium, silver, or the like. The current collector may have fine depressions and protrusions formed on its surface to enhance adhesive strength of the positive electrode active material, or may have various forms such as a film, a sheet, a foil, a net, a porous body, a foaming agent, a non-woven fabric body, and the like.

The present invention also provides a lithium secondary battery including the positive electrode, a negative electrode, a separator, and a lithium salt-containing non-aqueous electrolyte.

The negative electrode may be fabricated by applying a negative electrode mix including a negative electrode active material to a negative electrode current collector and drying the same, and may further include the components as described above as necessary.

The negative electrode current collector generally has a thickness ranging from 3 μm to 500 μm. The negative electrode current collector is not particularly limited so long as it has conductivity without causing a chemical change in the corresponding battery. For example, the negative electrode current collector may include copper, stainless steel, aluminum, nickel, titanium, a carbon material, a form obtained by treating a surface of copper or stainless steel with carbon, nickel, titanium, silver, or the like, an aluminum-cadmium alloy, or the like. Also, like the positive electrode current collector, the negative electrode current collector may have fine depressions and protrusions formed on its surface to enhance adhesive strength of the positive electrode active material, or may have various forms such as a film, a sheet, a foil, a net, a porous body, a foaming agent, a non-woven fabric body, and the like.

The separator is interposed between negative electrodes. An insulating thin film having a high ion permeability and mechanical strength is used as the separator. The separator has a pore diameter generally ranging from 0.01 μm to 10 μm and a thickness generally ranging from 5 μm to 300 μm. As the separator, for example, olefin-based polymer such as chemical resistant and hydrophobic polypropylene, or the like; and a sheet, non-woven fabric, or the like, are used. When solid electrolyte, such as polymer, or the like, is used as the electrolyte, the solid electrolyte may also serve as the separator.

The lithium salt-containing non-aqueous electrolyte includes aqueous electrolyte and lithium salt. A non-aqueous organic solvent, an organic solid electrolyte, inorganic solid electrolyte, or the like, is used as the aqueous electrolyte.

As the non-aqueous organic solvent, for example, an aprotic organic solvent such as N-methyl-2-pyrrolidinone, propylene carbonate, ethylene carbonate, butylenes carbonate, dimethyl carbonate, diethyl carbonate, gamma-butylolactone, 1,2-dimethoxy ethane, tetrahydroxy franc, 2-methyl tetrahydrofuran, dimethylsulfoxide, 1,3-dioxoran, formamide, dimethylformamide, dioxoran, acetonitrile, nitromethane, formic acid methyl, methyl acetate, phosphoric acid triester, trimethoxy methane, a dioxoran derivative, sulfolane, methyl sulfolane, 1,3-dimethyl-2-imidazolidinone, a propylene carbonate derivative, a tetrahydrofuran derivative, ether, propionic acid methyl, propionic acid ethyl, or the like, may be used.

As the organic solid electrolyte, for example, a polyethylene derivative, a polyethylene, oxide derivative, a polypropylene oxide derivative, a phosphoric acid ester polymer, a poly agitation lysine, polyester sulfide, polyvinyl alcohol, Polyvinylidene difluoride (PVDF), a polymer including an ionic dissociable group may be used.

As the inorganic solid electrolyte, for example, nitride of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_3PO_4$—$Li_2S$—$SiS_2$, halides, a sulfate, or the like, may be used.

The lithium salt is a material which can be easily dissolved in the non-aqueous electrolyte. As the lithium salt, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4-phenyl boric acid lithium, imide, or the like, may be used.

In order to improve charging/discharging characteristics, flammability, or the like, for example, pyridine, triethylphosphite, triethanolamine, cyclic ether, ethylene diamine, n-glyme, hexa phosphoric acid tri amide, a nitrobenzene derivative, sulfur, quinonimin-dyes, N-substituted oxazolidinone, N,N-substituted imidazolidine, ethylene, glycol dialkyl ether, ammonium salt, pyrrol, 2-methoxy ethanol, aluminum trichloride, or the like, may be added to the non-aqueous electrolyte. According to circumstances, a halogen-containing solvent such as carbon tetrachloride, ethylene trifluoride, or the like, may be further included in order to provide non-inflammability, or carbon dioxide may be further included in order to improve high temperature preservation characteristics.

The lithium secondary battery including the mixed positive electrode active material is charged at a voltage of 4.5 V or higher based on the positive electrode potential to provide lithium ions required for irreversibility of the negative electrode, and thereafter, when the lithium secondary battery is discharged, it can provide additional lithium to the positive electrode, thus sufficiently extending the operation voltage of the spinel-based lithium manganese oxide, whereby the high capacity lithium secondary battery can be provided and has a remarkably improved output exhibiting an even profile over the entire area without causing a rapid voltage drop in the 2.5V to 4V range.

The lithium secondary battery according to the present exemplary embodiment can be used as a power source of a small device, and preferably, it also can be used as a unit cell in a midsize and large battery module including a plurality of battery cells.

Preferred example of the midsize and large devices include a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system, but the present invention is not meant to be limited thereto.

Hereinafter, the present invention will now be described in more detail through embodiments, but the embodiments hereinafter are merely for illustrating the present invention and the scope of the present invention is not limited thereto.

Embodiment 1

Fabrication of Positive Electrode $0.5Li_2MnO_3$-$0.5Li(Mn0.33Ni0.33Cu0.33)O_2$ as a lithium manganese oxide having a layered structure and $LiMn_2O_4$ as spinel-based lithium manganese oxide were mixed in the ratio of 2:1 which was determined to be 80 wt % of the total weight of the positive electrode mix, and 7 wt % of denka black and 7 wt % of graphite as conductive materials and 6 wt % of PVDF as a binder were added to an NMP to create slurry. The slurry was applied to a positive electrode current collector and then rolled and dried to fabricate a positive electrode for a secondary battery.

Fabrication of Lithium Secondary Battery

The thusly fabricated positive electrode was included, a porous polyethylene separator was interposed between graphite-based negative electrodes, and lithium electrolyte was then injected to fabricate a coin type lithium secondary battery.

The coin type lithium secondary battery was CC/CV-charged at 4.6 V based on a positive electrode potential and then discharged at 2V (C-rate=0.1 C).

Embodiment 2

A positive electrode was fabricated through the same process as that of Embodiment 1 and a lithium secondary battery was fabricated in the same manner as that of Embodiment 1, except that 86 wt % of $LiMn_2O_4$, instead of $LiMn_2O_4$, 7 wt % of graphite, and 7 wt % of denka black were fabricated in the form of a complex through a high energy milling process, as the spinel-based lithium manganese oxide in Embodiment 1.

Comparative Example

In fabricating a positive electrode and a lithium secondary battery, a coin type lithium secondary battery was fabricated in the same manner as that of Embodiment 1, except that only $LiMn_2O_4$, instead of the mixed positive electrode active material obtained by mixing $0.5Li_2MnO_3$-$0.5Li(Mn0.33Ni0.33Cu0.33)O_2$ and $LiMn_2O_4$ in the above embodiment, was included to be 80 wt % of a total weight of the positive electrode mix.

Experimental Example

In order to confirm the operational effects in the 3V range of the positive electrode active material according to the present invention, a half cell was fabricated through the same method, except for the use of a lithium metal as a negative electrode active material in Embodiment 1.

The full cell or half cell secondary batteries fabricated according to Embodiments 1 and 2, Comparative Example, and Experimental Example were repeatedly charged and discharged under the condition of 0.1 C to measure the change in capacity according to cycles. The results are shown in FIGS. 1 to 4 in turn.

Figure 1:
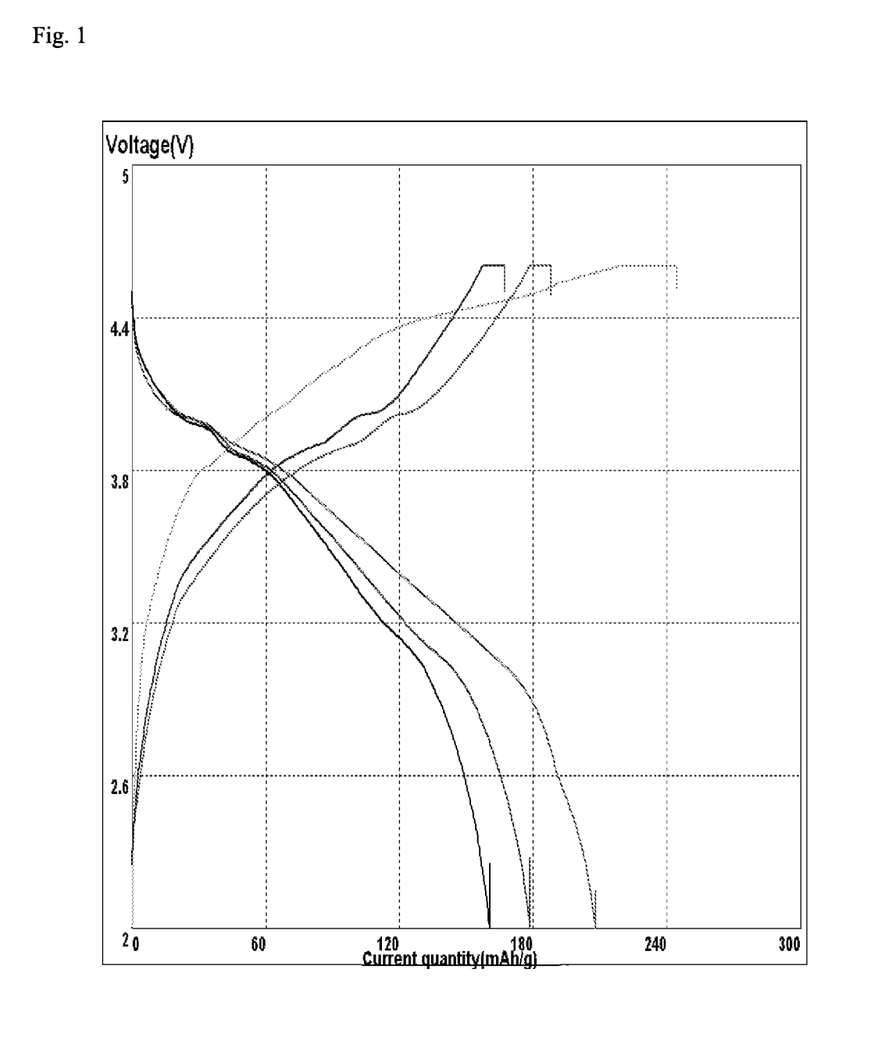
FIG. 1 is a graph showing charging and discharging cycles of a lithium secondary battery according to a first exemplary embodiment of the present invention.
Figure 2:
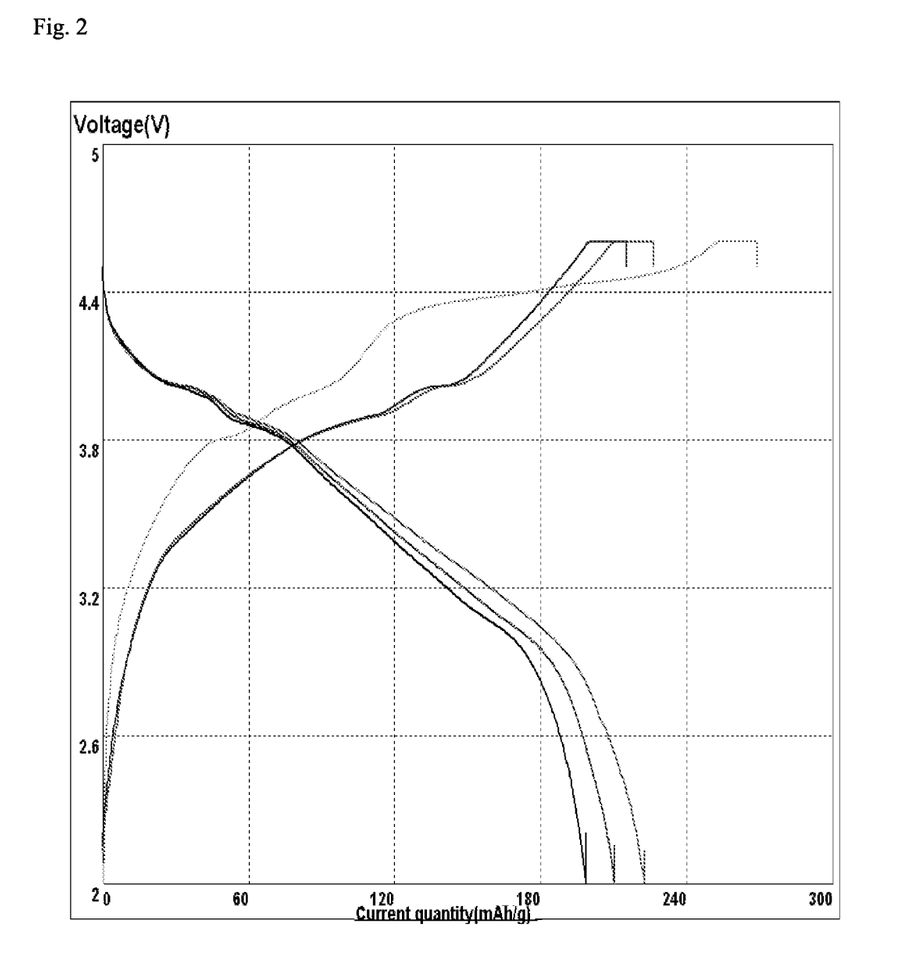
FIG. 2 is a graph showing charging and discharging cycles of a lithium secondary battery according to a second exemplary embodiment of the present invention.
Figure 3:
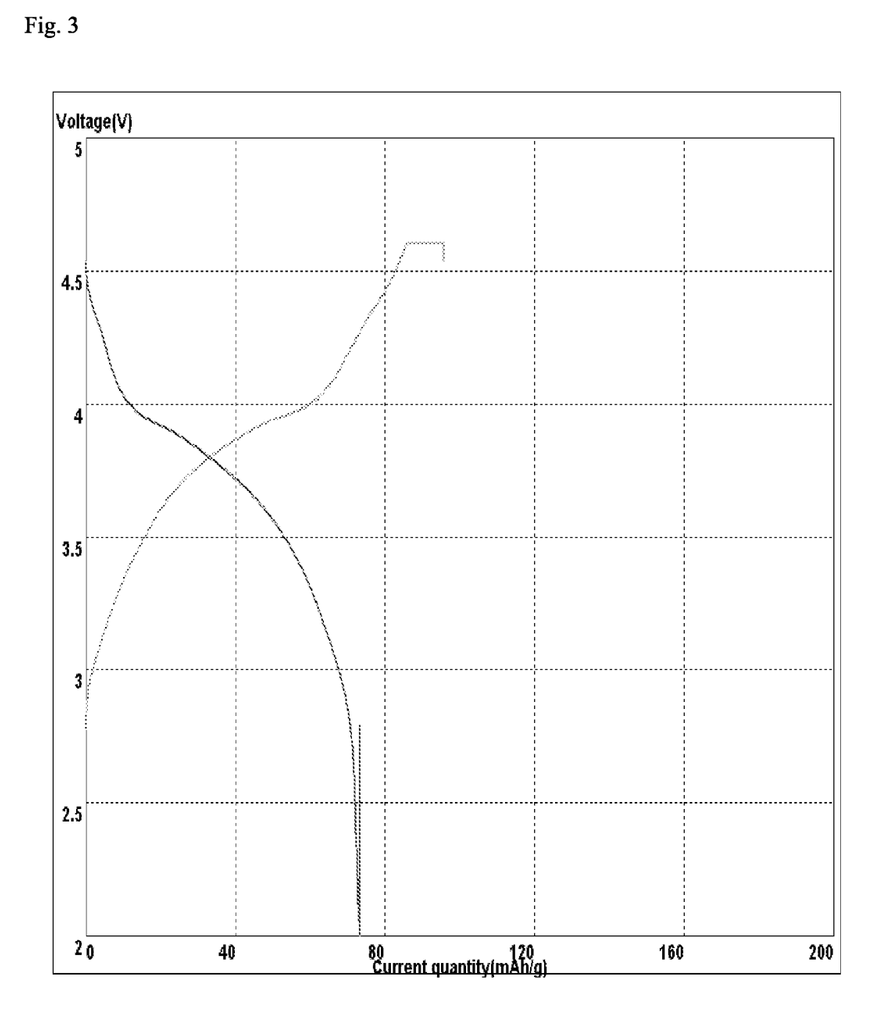
FIG. 3 is a graph showing charging and discharging cycles of a lithium secondary battery according to a comparative example of the present invention.
Figure 4:
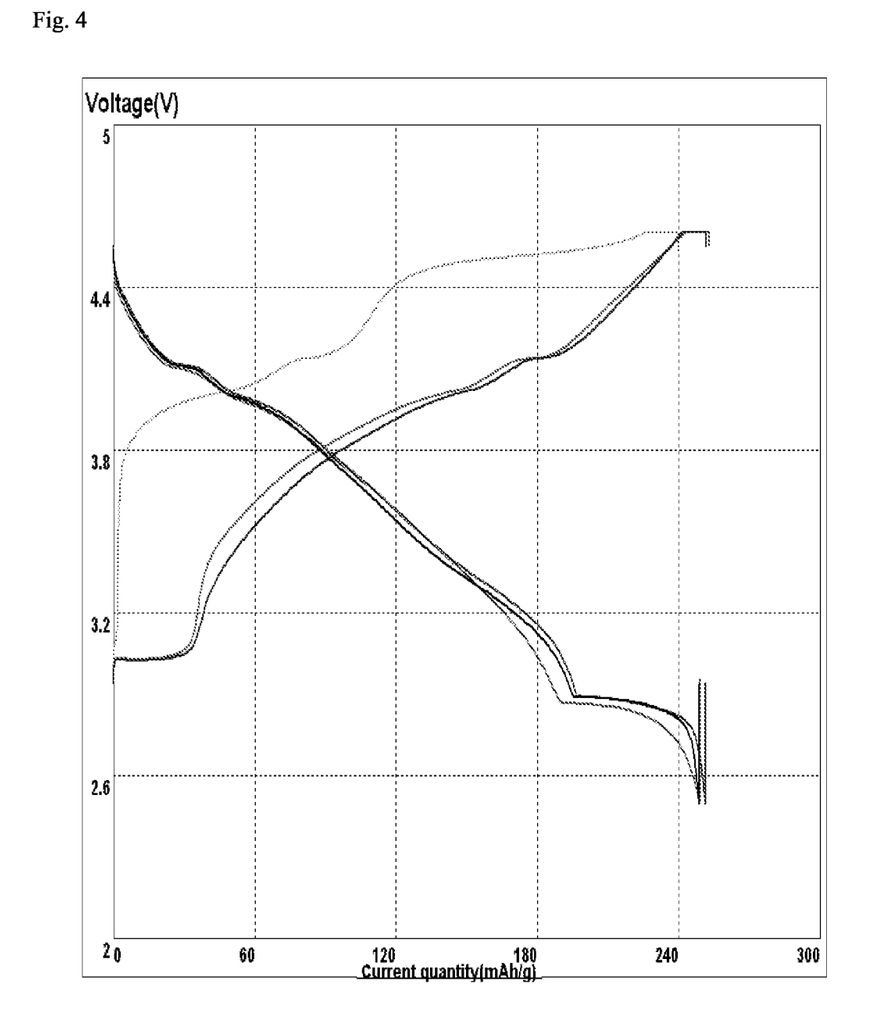
FIG. 4 is a graph showing charging and discharging cycles of a half cell according to an experimental example of the present invention.

FIG. 1 shows tilts of the current-voltage changes and profiles according to an increase in cycle in the 3V to 4V range of the secondary battery according to Embodiment 1. FIG. 2 shows tilts of the current-voltage changes and profiles according to an increase in cycle in the 3V to 4V range of the secondary battery according to Embodiment 2. FIG. 3 shows tilts of the capacities and profiles of the secondary battery according to Comparative Example. FIG. 4 shows tilts of the change in capacity and profiles according to the increase in the cycle of the half cell according to Experimental Example.

With reference to FIGS. 1 to 4, it is noted that, compared with the secondary battery according to Comparative Example, the secondary batteries according to Embodiments 1 and 2 have a great initial capacity and reduced capacity reduction phenomenon according to the increase in cycle, and even profiles without a rapid voltage drop over 2 V to 4.5 V. Thus, it is noted that the lithium secondary battery according to the present invention has excellent charging and discharging characteristics and stability and is a high capacity lithium secondary battery which is able to use the entire range of 2 V to 4.5 V.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A lithium secondary battery, comprising a positive electrode mix comprising a conductive material, binder and mixed positive electrode active material,
    wherein the mixed positive electrode active material comprises:
    a complex of a spinel-based lithium manganese oxide represented by [Chemical Formula 1] shown below with a carbon-based material in the range of 1 wt % to 15 wt % as a total weight of the complex, wherein in the complex, the carbon-based material is coated on the surface of particles of the spinel-based lithium manganese oxide, and
    a lithium manganese oxide having a layered structure represented by [Chemical Formula 2] shown below:
    wherein the mixed positive electrode active material includes 10 wt % to 40 wt % of the complex and 60 wt % to 90 wt % of the lithium manganese oxide having a layered structure represented by [Chemical Formula 2]

over 100 wt % as a total weight of the mixed positive electrode active material; and wherein the carbon-based material is one or more selected from the group consisting of graphene and conductive polymer, wherein the mixed positive electrode active material further comprises any one or two or more lithium-containing metal oxides selected from the group consisting of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and an oxide formed by substituting these with other elements or formed by doping other element(s) therein;

$$Li_{1+y}Mn_{2-y-z}M_zO_{4-x}Q_x \quad \text{[Chemical Formula 1]}$$

wherein $0 \leq x \leq 1$, $0 \leq y \leq 0.3$, and $0 \leq z \leq 1$, and M is one or more selected from the group consisting of Mg, Al, Ni, Co, Fe, Cr, Cu, B, Ca, Nb, Mo, Sr, Sb, W, B, Ti, V, Zr, and Zn, and Q is one or more selected from the group consisting of N, S, and Cl, and $$aLi_2MnO_3\text{-}(1\text{-}a)LiMO_2 \quad \text{[Chemical Formula 2]}$$

wherein $0<a<1$ and M is any one selected from the group consisting of Al, Mg, Mn, Ni, Co, Cr, V, Fe, Cu, Zn, Ti, and B, or two or more them simultaneously applied.

2. The lithium secondary battery of claim 1, wherein the other element(s) may be any one or two or more elements selected from the group consisting of Al, Mg, Mn, Ni, Co, Cr, V, and Fe.

3. The lithium secondary battery of claim 1, wherein the lithium-containing metal oxide is included to be 50 wt % or less over the total weight of the mixed positive electrode active material.

4. The lithium secondary battery of claim 1, wherein the lithium secondary battery is used as a unit cell of a battery module as a power source of a midsize or large device.

5. The lithium secondary battery of claim 4, wherein the midsize or large device is a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system.

6. A method for manufacturing a lithium secondary battery, the method comprising:

fabricating a mixed positive electrode active material by mixing a complex of a spinel-based lithium manganese oxide represented by [Chemical Formula 1] shown below with a carbon-based material or a precursor of the carbon-based material and a lithium manganese oxide having a layered structure represented by [Chemical Formula 2] shown below, mixing the mixed positive electrode active material with a conductive material and binder to prepare a positive electrode mix;

fabricating a lithium secondary battery including the positive electrode mix;

charging the lithium secondary battery at a voltage of 4.45 V or higher based on a positive electrode potential; and performing degassing, wherein the mixed positive electrode active material includes 10 wt % to 40 wt % of the complex and 60 wt % to 90 wt % of the lithium manganese oxide having a layered structure represented by [Chemical Formula 2] over 100 wt % as a total weight of the mixed positive electrode active material, wherein the mixed positive electrode active material further comprises any one or two or more lithium-containing metal oxides selected from the group consisting of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and an oxide formed by substituting these with other elements or formed by doping other element(s) therein, wherein the carbon-based material is one or more selected from the group consisting of graphene and conductive polymer, wherein in the complex, the carbon-based material is coated on the surface of particles of the spinel-based lithium manganese oxide represented by [Chemical Formula 1];

$$Li_{1+y}Mn_{2-y-z}M_zO_{4-x}Q_x \quad \text{[Chemical Formula 1]}$$

wherein $0 \leq x \leq 1$, $0 \leq y \leq 0.3$, and $0 \leq z \leq 1$, and M is one or more selected from the group consisting of Mg, Al, Ni, Co, Fe, Cr, Cu, B, Ca, Nb, Mo, Sr, Sb, W, B, Ti, V, Zr, and Zn, and Q is one or more selected from the group consisting of N, S, and Cl, and $$aLi_2MnO_3\text{-}(1\text{-}a)LiMO_2 \quad \text{[Chemical Formula 2]}$$

wherein $0<a<1$ and M is any one selected from the group consisting of Al, Mg, Mn, Ni, Co, Cr, V, Fe, Cu, Zn, Ti, and B, of two or more them simultaneously applied.

7. The method of claim 6, wherein, in charging the lithium secondary battery, the lithium secondary battery is charged at a voltage of 4.45V or higher based on the positive electrode potential in a formation operation, or in every several cycles or in every cycle following the formation operation.

8. The method of claim 6, wherein the complex is fabricated according to a dry method through high energy milling.

9. The method of claim 6, wherein the complex is fabricated according to a wet method of dispersing the carbon-based material and the spinel-based lithium manganese oxide represented by [Chemical Formula 1] in a solvent, coating the surface of the precursor of the carbon-based material, drying the same, and retrieving the solvent.

10. The method of claim 6, wherein the complex is fabricated by mixing a lithium precursor and a manganese precursor, synthetic raw materials of the spinel-based lithium manganese oxide represented by [Chemical Formula 1], and the carbon-based material or the precursor of the carbon-based material and firing the mixture at a temperature range of 650° C. to 800° C. in which the carbon-based material or the precursor is not oxidized.

* * * * *